United States Patent [19]

Wild

[11] 3,979,770
[45] Sept. 7, 1976

[54] SYSTEM FOR PREVENTING ERASURE OF AUDIO RECORDINGS

[75] Inventor: Albert F. Wild, Rochester, N.Y.
[73] Assignee: Tapecon, Inc., Rochester, N.Y.
[22] Filed: May 23, 1975
[21] Appl. No.: 580,149

[52] U.S. Cl. ............................ 360/60; 235/61.11 D; 360/2; 360/105
[51] Int. Cl.² .................. G11B 15/04; G11B 19/04
[58] Field of Search ................ 360/60, 105, 1, 2, 3; 235/61.11 D, 61.12 M

[56] References Cited
UNITED STATES PATENTS

| | | | |
|---|---|---|---|
| 3,641,277 | 2/1972 | Campbell | 360/60 |
| 3,755,641 | 8/1973 | Rackman | 360/60 |
| 3,777,074 | 12/1973 | Olmsted | 360/60 |
| 3,860,961 | 1/1975 | Budrose | 360/60 |
| 3,869,718 | 3/1975 | Schmidt | 360/60 |

Primary Examiner—Bernard Konick
Assistant Examiner—Jay P. Lucas
Attorney, Agent, or Firm—Stonebraker, Shepard & Stephens

[57] ABSTRACT

A system prevents erasure of audio material prerecorded on a magnetic recording strip on a card or photograph. Erasure of any selected portion of the recording strip is prevented by securing material to the card or photograph to thicken the card or photograph along the length of the magnetic strip that is not to be erased. The thickened portion of the card cannot be inserted into or moved along a slot in a magnetic eraser, and the thickened portion of the card is detected in a recording machine for disabling the record mode of the recorder to prevent recording over the portion of the magnetic strip that should not be erased. The material thickening the card is preferably secured to the face of the card opposite the face bearing the magnetic strip.

16 Claims, 13 Drawing Figures

SYSTEM FOR PREVENTING ERASURE OF AUDIO RECORDINGS

BACKGROUND OF THE INVENTION

Recording machines and adapters are available for recording onto and playing back from magnetic strips on cards or photographs that either move along a slot in the recorder or are tracked by a moving magnetic head within the recorder. Magnetic strips on cards and photographs allow recordings of a few seconds in length and are useful for brief comments or messages and for many educational applications.

In some circumstances, it is desirable to have a prerecorded message that cannot be erased or recorded over, and this is especially useful where a pre-recorded question, instruction, pronunciation, example, etc. is recorded on an instruction portion of a card, and another portion of the same card is reserved for a student response or imitation. The pre-recorded portion must not be erased or recorded over if the card is to be used over and over by a succession of students. One previous way of doing this was to use more than one recording strip on a card so that one magnetic strip was reserved for instructional purposes and another was used and reused by students. This complicates the recorder and requires capacity to track two different magnetic strips in the same device.

Recent innovations in the art of recording onto and playing back from magnetic strips on cards or photographs have produced a much slower tracking speed allowing much longer messages to be recorded and played back from a single magnetic strip of ordinary length. This makes it feasible for a portion of a single magnetic strip to be reserved for instructional messages and another portion of the same strip to be used repeatedly by students, but it also requires some system for preventing accidental erasure of the pre-recorded instructional portion.

The invention involves recognition of a simple and economical way that any selected portion of a magnetic recording strip on a card or photograph can be protected from accidental erasure or re-recording to preserve the pre-recorded material. The invention aims at simplicity, economy, reliability, and ease of operation in insuring that any desired portion of a magnetic recording strip not be erased or recorded over and only predetermined portions of any magnetic strip can be recorded on.

SUMMARY OF THE INVENTION

The invention applies to systems for recording onto and playing back from a magnetic recording strip extending along a face surface of a card or photograph, and the invention prevents erasure or recording over of any selected portion of the magnetic recording strip. This is accomplished by securing material to the card or photograph so the material extends for a length equal to the length of the selected portion of the magnetic strip and so the material substantially thickens the card or photograph. The thickening material is located so that the selected portion of the magnetic strip cannot be fitted into an erasure slot, and means in the recorder detects the presence of this thickening material and disables the record mode of the recorder to prevent recording over the selected portion of the magnetic strip. Only a minor change in the recorder then prevents erasure wherever the thickening material is present, and the same thickening material can also prevent erasure in a magnetic slot.

DRAWINGS

DETAILED DESCRIPTION

Figure 1:
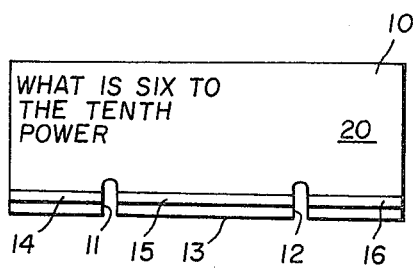
FIG. 1 is a front elevational view of an example of a recording card protected from erasure according to the invention.
Figure 2:
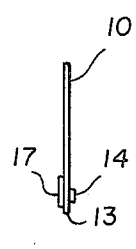
FIG. 2 is a side elevational view of the card of FIG. 1.
Figure 3:
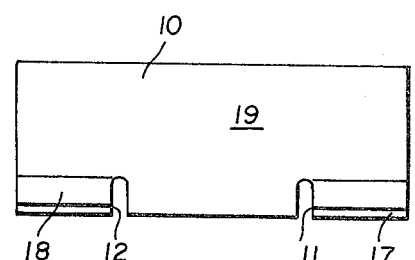
FIG. 3 is a rear elevational view of the card of FIG. 1.

One preferred example of application of the invention to a magnetic recording card 10 is shown in FIGS. 1–3. Card 10 has a pair of notches 11 and 12 extending inward from edge 13 and crossing a magnetic recording strip to divide the strip into three segments 14–16 for purposes explained below. Magnetic strip 15 is for student use and can be recorded, played back, erased, and re-recorded many times by many students, and magnetic strips 14 and 16 are reserved for instructional recording protected from erasure. This is accomplished by strips 17 and 18 secured to the rear face 19 of card 10 opposite front face 20 bearing magnetic strips 14–16. Strips 17 and 18 are preferably formed of card stock and secured to card 10 by adhesive and a length of strip material can be cut and applied to card 10 to locate strips 17 and 18 as desired. The thickening of card 10 by strips 17 and 18 prevents erasure of pre-recorded instructional material on magnetic strips 14 and 16 as explained below.

Figure 4:
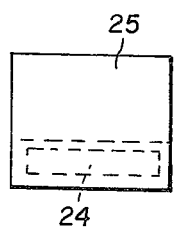
FIG. 4 is a plan view of a slot-type eraser and magnetic recording card.
Figure 5:
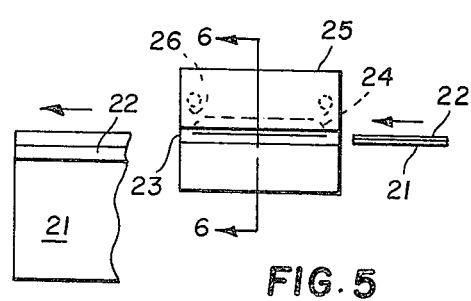
FIG. 5 is a front elevational view of the eraser and card of FIG. 4.
Figure 6:
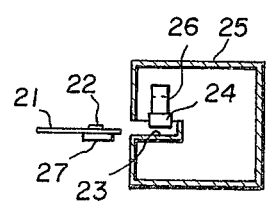
FIG. 6 is a cross sectional view of the eraser of FIG. 5 taken along the line 6—6 thereof.

As best shown in FIGS. 4–6, a magnetic recording strip 22 on a card 21 can be erased by manually drawing card 21 through the slot 23 of an eraser 25 having a magnet 24 adjacent slot 23. Magnet 24 is preferably biased into slot 23 by a spring 26 so that when card 21 is manually moved through slot 23, magnet 24 engages magnetic strip 22 and erases any recording.

For any portion of magnetic strip 22 that should not be erased, a backing strip of material 27 is secured to the rear of card 21 opposite the portion of magnetic strip 22 to be protected from erasure as explained above relative to a similar card 10. Strip 27 then thickens card 21 enough so that the protected portion of strip 22 cannot be inserted into slot 23 to engage magnet 24.

Another way that thickening strip 27 can be used to prevent erasure of magnetic strip 22 on card 21 is illustrated in FIGS. 9–12. Recorder 28 has a slot through which card 21 is driven by drive roller 30 so that magnetic recording strip 22 is pressed against magnetic head 31 on carriage 32. The way this works is best shown in the enlarged views of FIGS. 10–12.

Carriage 32 is movably supported on a pivot 33 and is biased toward drive roller 30 by a spring 34. Drive roller 30 engages the back side of card 21 to drive magnetic strip 22 past magnetic head 31 for recording or playing back. An erasable portion of magnetic strip 22 is shown moving past magnetic head 31 in FIG. 10.

Figure 11:
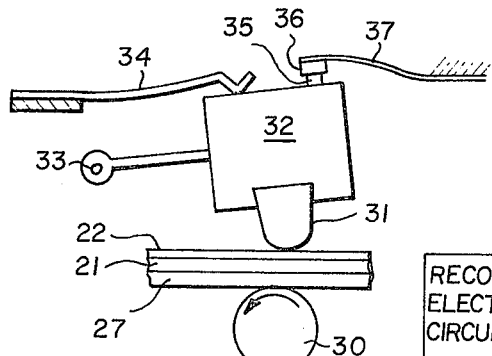

A non-erasable portion of magnetic strip 22 is shown moving past magnetic head 31 in FIG. 11. Thickening strip 27 secured to the back of card 21 increases the thickness of card 21 so as to move magnetic head 31 and carriage 32 farther away from drive roller 30 against the bias of spring 34. This brings a contact 35 on carriage into engagement with a contact 36 on spring arm 37 which provides an electrical path to ground as illustrated. The closure of contacts 35 and 36 is arranged for disabling the record mode of recorder 28 to prevent any re-recording on magnetic strip 22 in the region of thickening strip 27.

Figure 12:
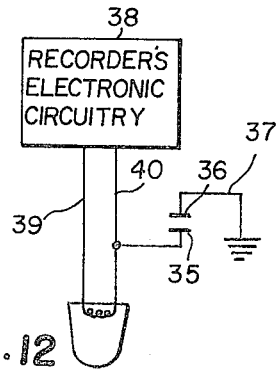
FIG. 12 is a partially schematic circuit diagram of the operation of the recorder according to the invention.

The way this works is best shown in FIG. 12. The electronic circuitry 38 for recorder 28 is connected to magnetic head 31 through lines 39 and 40. In the play mode of recorder 28, line 39 is energized and line 40 is grounded, and this is reversed in the record mode where line 40 is energized and line 39 is grounded. Contact 35 is connected to line 40, and contact 36 is connected to ground so that when contacts 35 and 36 close as shown in FIG. 11, line 40 is grounded. This does not interfere with the play operation of recorder 28, because line 40 is grounded anyway during play of an audio message from a recording strip. Grounding of line 40 disables the record mode of recorder 28 because line 40 is normally energized during the record mode, and with contacts 35 and 36 closed, both lines 39 and 40 are grounded so that no recording signal reaches magnetic head 31 and no recording is possible. This prevents recording over any portion of magnetic strip 22 protected by thickening strip 27.

Figure 7:
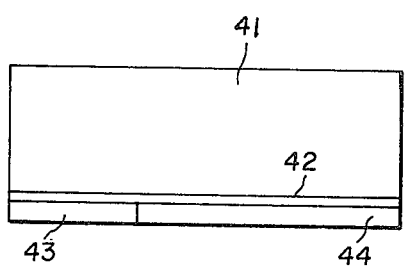
FIG. 7 is a front elevational view of another embodiment of a card having the inventive erasure protection.
Figures 8, 8A:
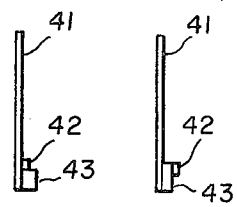
FIGS. 8 and 8a are side elevational views respectively of the card of FIG. 7 and of an alternative card similar to the card of FIG. 7.
Figure 9:
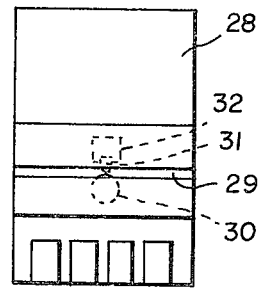
FIG. 9 is a partially schematic plan view of a slot recorder using the inventive improvement.

FIGS. 7 and 8 show an alternative embodiment of a recording card 41 having a magnetic recording strip 42 a portion of which is protected from erasure or re-recording by a thickening strip 43 secured to the front face of card 41 between magnetic strip 42 and the adjacent edge 44 of card 41. As shown in FIG. 8a, thickening strip 43 can also be secured to the front face of card 41 to underlie magnetic strip 42 and to extend between card 41 and magnetic strip 42. There are many other ways to arrange thickening material on a card to prevent erasure of pre-recorded audio material on a magnetic recording strip. Thickening material can extend for the entire length of a recording strip if desired to prevent any erasure or re-recording, and thickening material can be much wider than the magnetic recording strip and can extend from top to bottom of a card if desired. The thickening material can also be longitudinally displaced from the portion of the magnetic strip to be protected from erasure, depending upon the way the recorder is adapted for sensing the thickening material. For example, if the switch or sensing device in the recorder is spaced laterally from a magentic head used for recording or erasing, thickening can be appropriately located to cooperate with the switch or sensing device to protect the desired portion of the magnetic strip from either erasure or re-recording or both. Thickening material can be placed on either the front or rear face of the card or photograph, and the thickening material can be arranged anywhere on the card where it can be detected or used to prevent erasure of the recording strip. For recorders that allow the card or photo to remain motionless, the thickening material must be coextensive with the portion of the magnetic strip to be protected from re-recording, and the thickening material can be either on the front or rear face of the card or photograph and either adjacent or under the magnetic strip.

Figure 10:
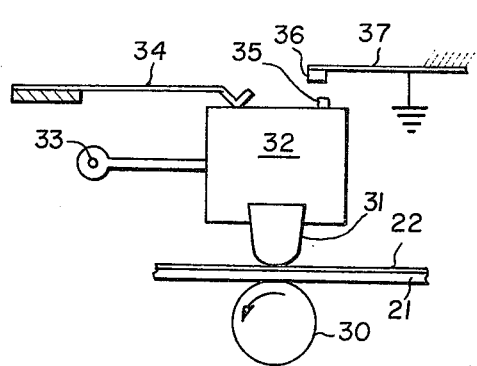
FIGS. 10 and 11 are enlarged, partially schematic plan views of the operation of the invention in a recorder.

Notches 11 and 12 as shown in FIGS. 1 and 3 are useful in separating non-erasable and erasable portions of the magnetic recording strip and in providing a stopping point for card 10. When a card drive such as shown in FIGS. 10 and 11 is used with a drive roller 30 opposite magnetic head 31, magnetic head 31 falls into notches 11 and 12 and engages drive roller 30 harmlessly to stop the motion of card 10 when a notch reaches the magnetic head. Motion resumes merely by pushing card 10 further into the slot so that roller 30 again engages the back of card 10 and advances it to the next notch or to the end of the card. Card 10 can then be arranged with a question, problem, example, etc. pre-recorded and non-erasable on strip 14 such as the question, "What is six to the tenth power?" As the student plays card 10, he reads the question on the card and hears the question played from strip 14 until card 10 stops with notch 11 adjacent the magentic head of the recorder. The student then formulates an answer and records it on student strip 15 as the card proceeds until notch 12 comes adjacent the magnetic head. Then by pushing the card into engagement with the drive roller, the student advances the card to play back from strip 16 where the correct answer is recorded. The student then compares the correct answer with the answer recorded on strip 15 and can erase strip 15 and re-record a different answer if desired.

Holes can be substituted for notches 11 and 12, and any desired number of notches or holes can be used to divide a magnetic recording strip into segments used for different purposes. The non-erasable segments of the strip are protected by thickening strips, and the erasable segments are left unprotected for recording, erasing, or re-recording.

There are many ways that thickness detecting devices, switches, etc. can be built into a recorder to detect thickened portions of a card and disable the record mode of the recorder to prevent recording over a permanent audio message. There are also many uses for the invention, especially for educational purposes, and those skilled in the art will appreciate the many ways and the many reasons why the invention can be applied to cards and photographs for preventing erasure of entire magentic strips or portions of magnetic strips.

I claim:

1. In a system for recording onto and playing back from a magnetic recording strip extending along a face surface of a card or photograph and including a recorder having a slot and a magnetic head adjacent said slot for tracking said magnetic strip, an improvement preventing recording over any selected portion of said magnetic strip, said improvement comprising:

a. material secured to said card or photograph and extending along said card or photograph for a length equal to the length of said selected portion of said magnetic strip;
   b. said material substantially thickening said card or photograph in the region of said material;

c. means in said recorder for detecting the presence of said material on said card or photograph for said length of said material; and d. means in said recorder responsive to said detecting means for disabling the record mode of said recorder to prevent recording over said selected portion of said magnetic strip.

2. The improvement of claim 1 wherein said material is parallel with and coextensive with said selected portion of said magnetic strip.

3. The improvement of claim 2 wherein said material is secured along an edge region of said card or photograph between said magnetic strip and the adjacent edge of said card or photograph.

4. The improvement of claim 1 wherein said material is secured to said face surface bearing said magnetic strip.

5. The improvement of claim 4 wherein said material extends between said card and said selected portion of said magnetic strip.

6. The improvement of claim 1 wherein said material is secured to the face surface of said card or photograph opposite said face surface bearing said magnetic strip.

7. The improvement of claim 6 wherein said material extends along said card or photograph opposite said selected portion of said magnetic strip.

8. The improvement of claim 1 wherein said disabling means is arranged for grounding the side of said magnetic head that is energized during said record mode.

9. The improvement of claim 1 including a drive roller opposite said magnetic head for moving said card or photograph through said slot and a spring for biasing said magnetic head toward said drive roller, and wherein said material is coextensive with said selected portion of said magnetic strip, and said detecting means includes a switch responsive to the position of said magnetic head relative to said drive roller as determined by the thickness of said card or photograph.

10. The improvement of claim 9 wherein a portion of said card or photograph and said magnetic strip are cut out to stop movement of said card or photograph in said slot when said cut-out portion reaches said magnetic head and said drive roller.

11. The improvement of claim 10 wherein said selected portion of said magnetic strip is on one side of said cut-out portion.

12. The improvement of claim 9 wherein said material is secured to the face surface of said card or photograph opposite said face surface bearing said magnetic strip.

13. The improvement of claim 9 wherein said material is secured to the face surface of said card or photograph bearing said magnetic strip and extends between said card and said selected portion of said magnetic strip.

14. The improvement of claim 9 wherein said disabling means is arranged for grounding the side of said magnetic head that is energized during said record mode.

15. The improvement of claim 14 wherein a portion of said card or photograph and said magnetic strip are cut out to stop movement of said card or photograph in said slot when said cut-out portion reaches said magnetic head and said drive roller.

16. The improvement of claim 15 wherein said selected portion of said magnetic strip is on one side of said cut-out portion.

* * * * *